US011923795B2

United States Patent
Latham

(10) Patent No.: US 11,923,795 B2
(45) Date of Patent: Mar. 5, 2024

(54) SYSTEM AND METHOD FOR VOLTAGE CALIBRATION

(71) Applicant: Haier US Appliance Solutions, Inc., Wilmington, DE (US)

(72) Inventor: Joseph Wilson Latham, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/671,798

(22) Filed: Feb. 15, 2022

(65) Prior Publication Data

US 2023/0261602 A1 Aug. 17, 2023

(51) Int. Cl.
*H02P 27/08* (2006.01)
*H02P 23/14* (2006.01)

(52) U.S. Cl.
CPC .............. *H02P 27/08* (2013.01); *H02P 23/14* (2013.01)

(58) Field of Classification Search
None
See application file for complete search history.

(56) References Cited

U.S. PATENT DOCUMENTS

| | | | |
|---|---|---|---|
| 8,107,267 | B2 | 1/2012 | Tallam et al. |
| 8,531,141 | B2 | 9/2013 | Wu et al. |
| 9,762,164 | B2 | 9/2017 | Campbell et al. |
| 10,250,161 | B1 | 4/2019 | Leggate et al. |

FOREIGN PATENT DOCUMENTS

| | | | | |
|---|---|---|---|---|
| CN | 112260559 | A | | 1/2021 |
| DE | 102012111696 | A1 | | 6/2014 |
| EP | 3104516 | B1 | | 12/2016 |
| JP | 2021022963 | A | * | 2/2021 |

* cited by examiner

*Primary Examiner* — Said Bouziane
(74) *Attorney, Agent, or Firm* — Dority & Manning, P.A.

(57) ABSTRACT

A method for operating a voltage source inverter is provided, the method including inducing, via the voltage source inverter, a DC current at a load device to obtain a load voltage value; determining an ideal switching-averaged voltage based on a switching modulation scheme; determining a combined semiconductor voltage drop and deadtime effect; and adjusting the switching modulation scheme such that a resulting ideal switching-averaged voltage is based on the combined semiconductor voltage drop and deadtime effect and the load voltage value.

20 Claims, 9 Drawing Sheets

SYSTEM AND METHOD FOR VOLTAGE CALIBRATION

FIELD

The present disclosure generally pertains to systems and methods for voltage calibration, and, more specifically, to methods for self-calibrating, online, or sensor-less voltage calibration for a power electronics device.

BACKGROUND

Various apparatuses that include a three-phase motor, an alternating current (AC) motor, or a non-direct current (DC) motor generally, may desire sensor-less motor controls, such as to reduce cost, size, and complexity of the motor and controller. A voltage-source inverter generally includes one or more switching legs or phases. The switching leg or phase includes stacked switching devices in parallel with a direct current (DC) bus of the inverter. Generally, software is used to determine the switching states of the inverter switching legs in order to provide a desired output voltage. Since the voltage output is switched, the instantaneous voltage value is approximately discrete. To achieve continuous voltage values, the software controls the percentage of time that the output is in a given state. The effective output voltage is generally considered to be the switching averaged value.

However, there are losses associated with inverter such that the output voltage at the load will mismatch the voltage requested by the inverter. Such inaccuracy of the voltage is undesirable for the inverter control software, such as to adversely affect power output calculations and sensor-less motor control.

Sensor-less motor control requires relatively accurate feedback, in contrast to measuring voltage directly and controlling using the measured voltage. While systems for measuring voltage directly may provide accurate feedback, such systems add feedback loops and complexity, which is inefficient and costly.

Accordingly, systems and methods for accurate voltage determination are desired for sensor-less motor controls. Furthermore, systems and methods for accurately determining the voltage applied to the load device and the current induced at the load device is desired for tracking the speed and angle of the motor for desired motor control. As such, systems and methods for determining motor drive voltage while minimizing or eliminating a need for sensors is desired.

BRIEF DESCRIPTION

Aspects and advantages of the invention will be set forth in part in the following description, or may be obvious from the description, or may be learned through practice of the invention.

An aspect of the present disclosure is directed to a method for operating a voltage source inverter. The method includes inducing, via the voltage source inverter, a DC current at a load device to obtain a load voltage value; determining an ideal switching-averaged voltage based on a switching modulation scheme; determining a combined semiconductor voltage drop and deadtime effect; and adjusting the switching modulation scheme such that a resulting ideal switching-averaged voltage is based on the combined semiconductor voltage drop and deadtime effect and the load voltage value.

Another aspect of the present disclosure is directed to a system for voltage calibration. The system includes a load device, a voltage source inverter, and a controller, the controller configured to execute instructions that, when performed by the load device, causes the load device to perform operations. The operations include inducing, via the voltage source inverter, a DC current at a load device to obtain a load voltage value; determining an ideal switching-averaged voltage based on a switching modulation scheme; determining a combined semiconductor voltage drop and deadtime effect; and adjusting the switching modulation scheme such that a resulting ideal switching-averaged voltage is based on the combined semiconductor voltage drop and deadtime effect and the load voltage value.

Still another aspect of the present disclosure is directed to a controller for a load device. The controller includes a memory device operably coupled to a processor, the memory device configured to store instructions that, when executed by the processor, causes the load device to perform operations. The operations include inducing, via the voltage source inverter, a DC current at the load device to obtain a load voltage value; determining, from the load voltage value, a DC current value; comparing the load voltage value to an inverter output voltage to determine a semiconductor voltage drop and a deadtime effect as a function of the DC current value; and adjusting the inverter output voltage based on the semiconductor voltage drop and the deadtime effect.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
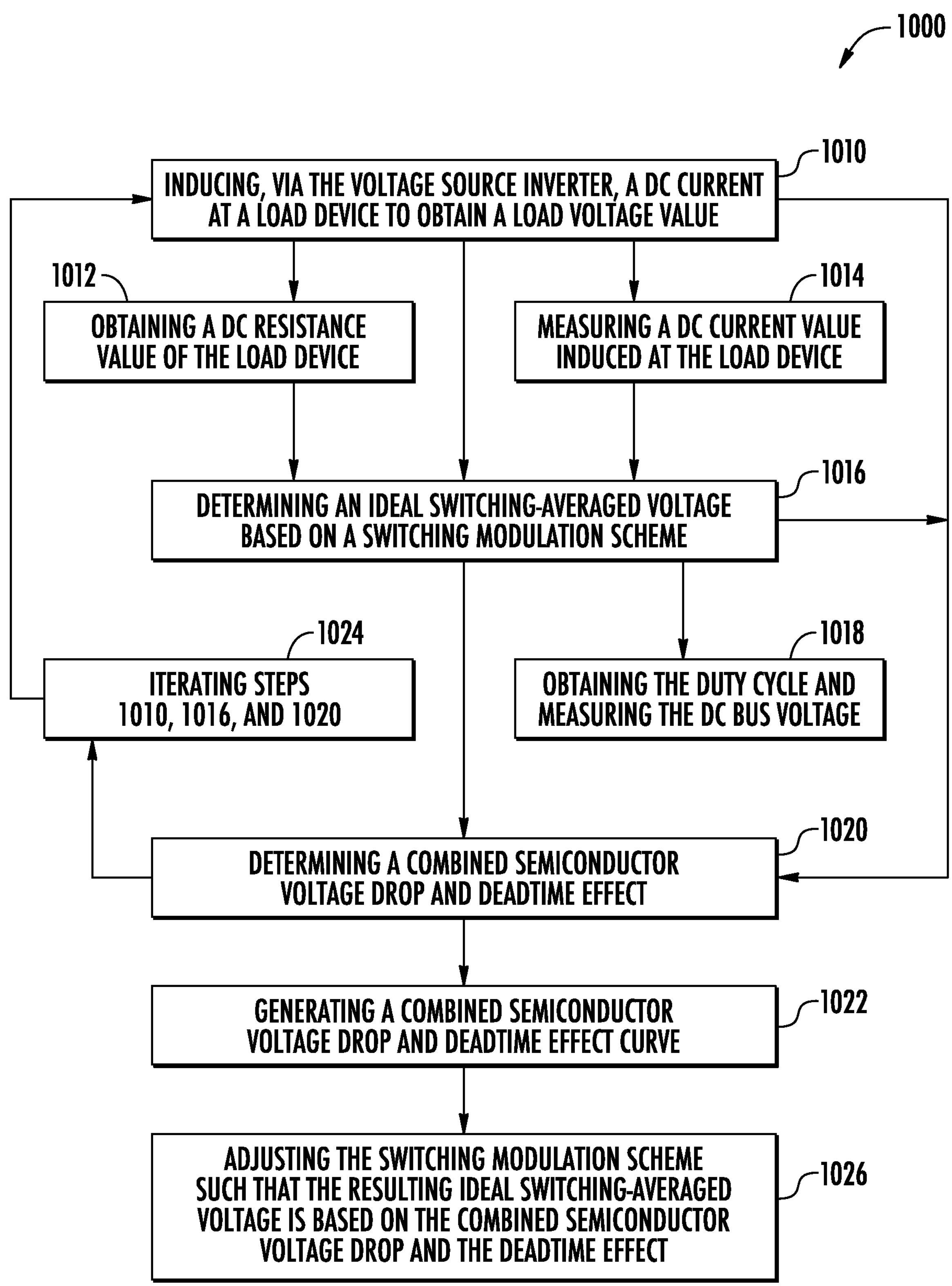
FIG. 1 depicts a flowchart outlining steps of a method for operating a voltage source inverter in accordance with exemplary embodiments of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms “first”, “second”, and “third” may be used interchangeably to distinguish one component from another and are not intended to signify location or importance of the individual components.

Embodiments of a controller and method for operating a voltage source inverter are provided. The method may particularly provide voltage source inverter calibration such that a voltage output by a load device is adjusted to allow for an actual voltage output substantially equal to a desired voltage output. Embodiments of the method may particularly provide a method for self-calibration of the voltage source inverter.

Embodiments of the controller and method provided herein accurately determine a voltage applied to a load device and a current induced at the load device, such as to allow for sensor-less motor controls. Embodiments provided herein allow for accurately determining the voltage applied to the load device and the current induced at the load device, such as to track the speed and angle of a motor for desired motor control. Embodiments provided herein may minimize or eliminate a need for sensors for controlling the load device, such as to provide sensor-less motor control. Particular embodiments may provide methods for control and a controller for an alternating current (AC) motor, or a non-direct current (DC) motor generally.

Figure 2:
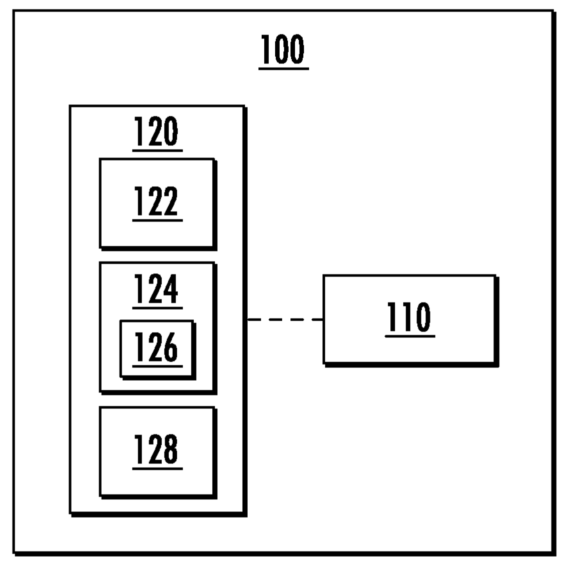
FIG. 2 depicts a schematic embodiment of a system at which a voltage source inverter operates in accordance with exemplary embodiments of the present subject matter.

Referring now to FIG. 1, a flowchart outlining exemplary steps of a method for operating a voltage source inverter (hereinafter, “method 1000”) is provided. FIG. 2 provides an exemplary schematic embodiment of a system 100 at which a voltage source inverter operates. The system 100 includes a controller 120 and a load device 110. The controller 120 includes a processor 122, a memory device 124, and a communications module 128. The memory device 124 is configured to receive and store instructions 126 that, when executed by the processor 122, causes the load device 110 to perform operations. The communications module 128 provides a wired or wireless bus to send and/or receive signals at the load device 110, including commands based on the instructions 126. The instructions 126 include one or more steps of method 1000, such as provided further herein.

As used herein, the term “processor” refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory device may generally include memory element(s) including, but not limited to, computer readable medium (e.g., random access memory (RAM)), computer readable non-volatile medium (e.g., flash memory), or other suitable memory elements or combinations thereof.

Figure 3:
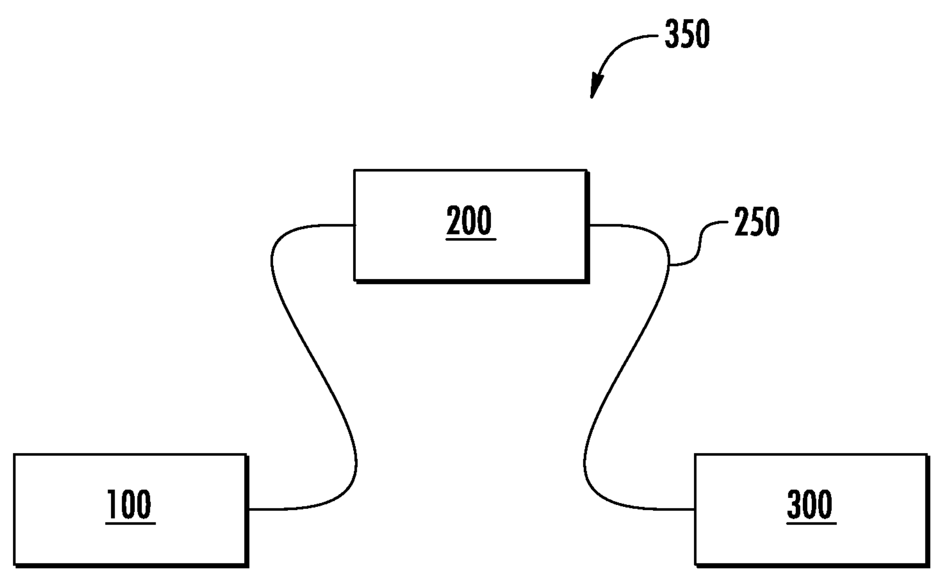
FIG. 3 depicts an external communication system in accordance with exemplary embodiments of the present subject matter.
Figure 5:
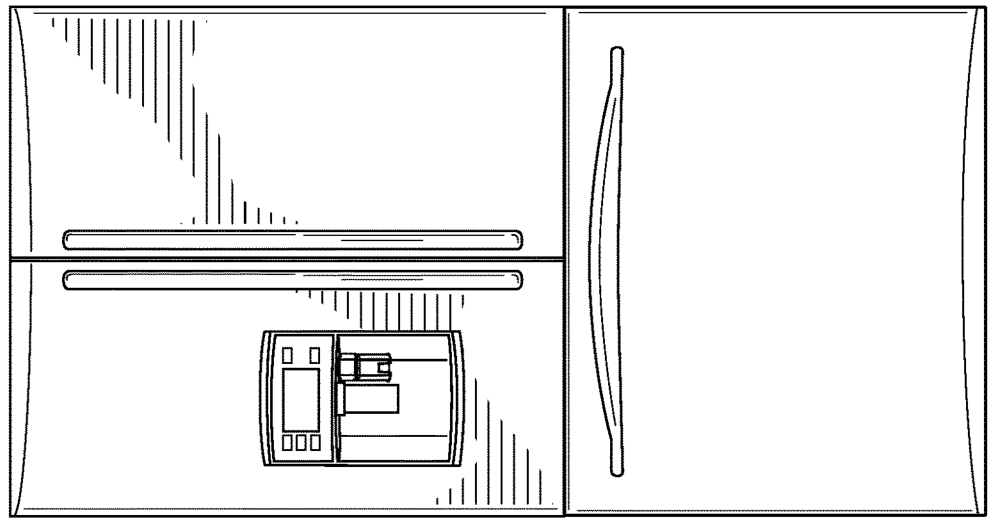
FIG. 5 depicts an embodiment of the system as a refrigeration appliance in accordance with exemplary embodiments of the present subject matter.
Figure 4:
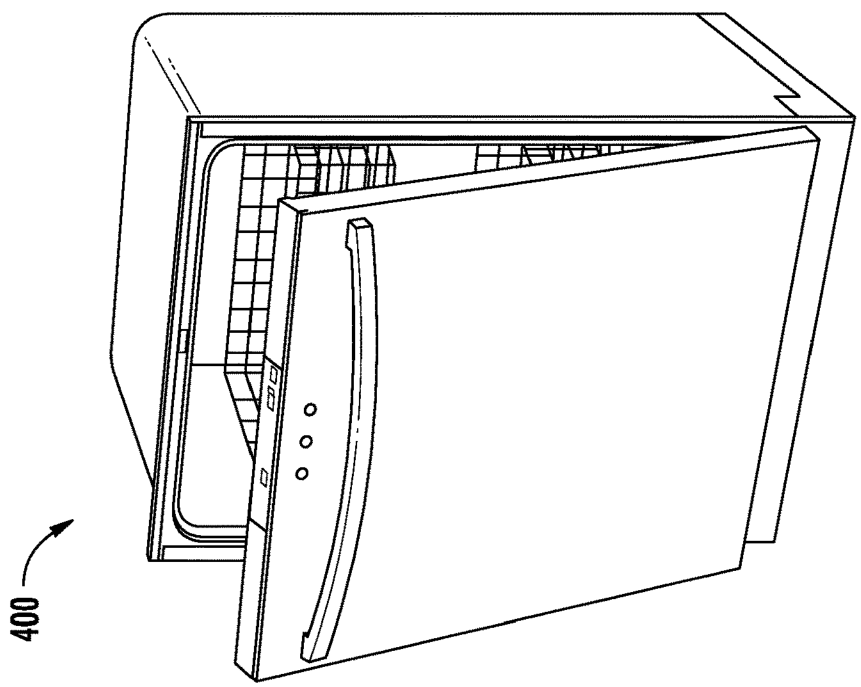
FIG. 4 depicts an embodiment of the system as a dishwashing appliance in accordance with exemplary embodiments of the present subject matter.

Referring now to FIG. 3, a schematic diagram of an external communication system 350 will be described according to an exemplary embodiment of the present subject matter. In general, external communication system 350 is configured for permitting interaction, data transfer, and other communications between system 100 and one or more external devices 300. For example, this communication may be used to provide and receive operating parameters, user instructions or notifications, performance characteristics, user preferences, or any other suitable information for improved performance of system 100. In a particular embodiment, the external device 300 may command execution of one or more steps of method 1000 at system 100, such as to provide a system for online voltage source inverter calibration. In addition, it should be appreciated that external communication system 350 may be used to transfer data or other information to improve performance of one or more external devices or systems and/or improve user interaction with such devices.

For example, external communication system 350 permits controller 120 to communicate with a separate external device 300 to system 100. As described in more detail below, these communications may be facilitated using a wired or wireless connection, such as via a network 250, cloud computing system, or distributed network. In general, external device 300 may be any suitable device separate from washing machine appliance 100 that is configured to provide and/or receive communications, information, data, or commands from a user. In this regard, external device 300 may be, for example, a personal phone, a smartphone, a tablet, a laptop or personal computer, a wearable device, a smart home system, or another mobile or remote device.

In addition, a remote server 200 may be in communication with system 100 and/or external device 300 through the network 250. In this regard, for example, remote server 200 may be a cloud-based server, and is thus located at a distant location, such as in a separate building, city, state, country, etc. According to an exemplary embodiment, external device 300 may communicate with the remote server 200 over network 250, such as the Internet, to transmit/receive data or information, provide user inputs, receive user notifications or instructions, interact with or control washing machine appliance 100, etc. In addition, external device 300 and remote server 200 may communicate with system 100 to communicate similar information.

In general, communication between system 100, external device 300, remote server 200, and/or other user devices may be carried using any type of wired or wireless connection and using any suitable type of communication network, non-limiting examples of which are provided below. For example, external device 300 may be in direct or indirect communication with system 100 through any suitable wired or wireless communication connections or interfaces, such as network 250. For example, network 250 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL). Particular portions of controller 120, such as the communications module 128, may be in operable communication with network 250, such as to receive or provide instructions, commands, etc. between external device 300 and memory device 124. External device 300 may accordingly command performance of steps of method 1000 at system 100, such as online calibration at the load device 110.

External communication system 350 is described herein according to an exemplary embodiment of the present subject matter. However, it should be appreciated that the exemplary functions and configurations of external communication system 350 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Figure 7:
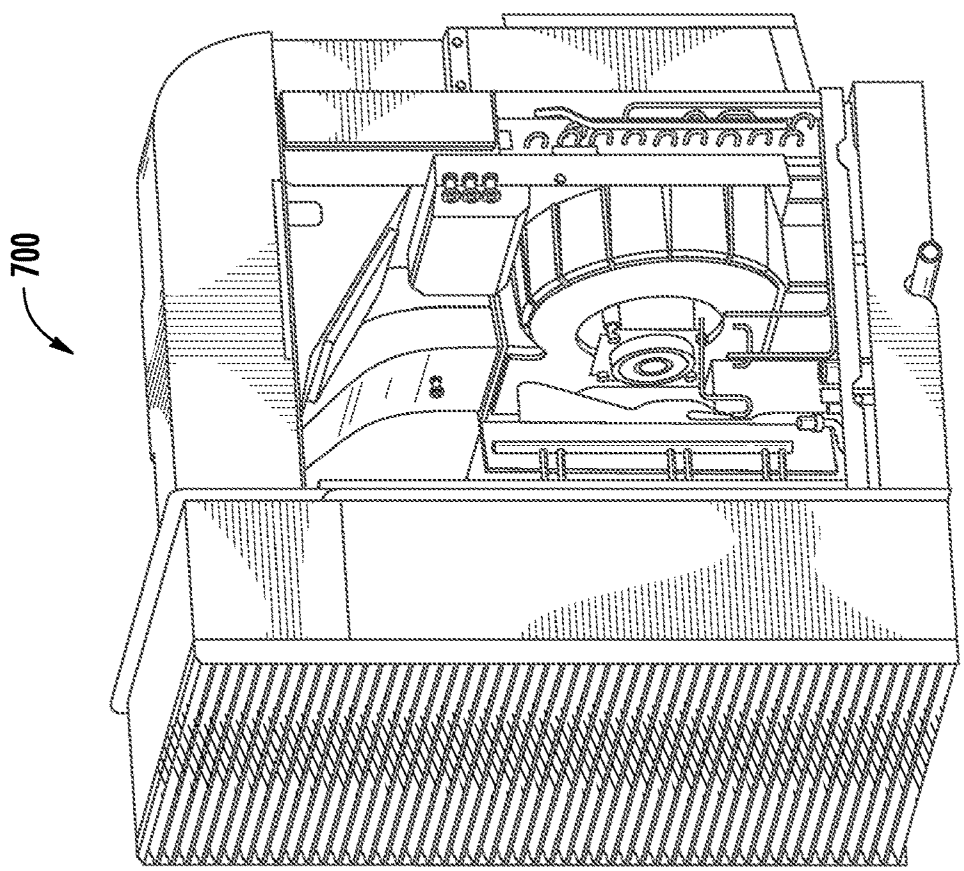
FIG. 7 depicts an embodiment of the system as an air conditioning unit in accordance with exemplary embodiments of the present subject matter.
Figure 6:
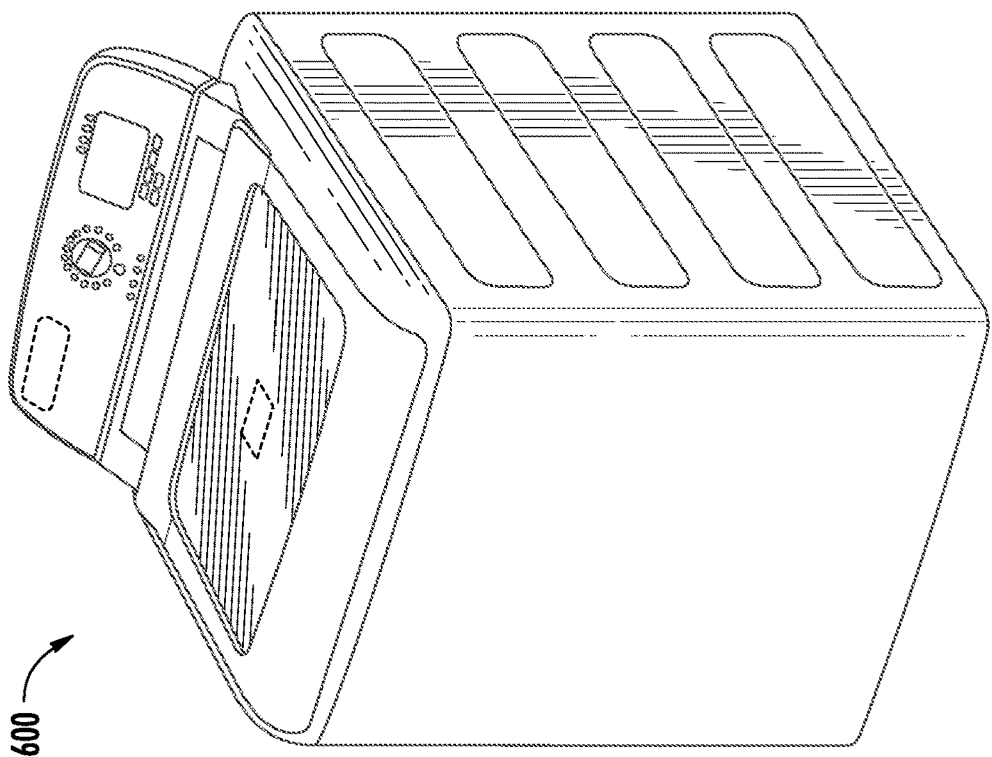
FIG. 6 depicts an embodiment of the system as a washing machine appliance in accordance with exemplary embodiments of the present subject matter.

Referring now to FIGS. 4-7, exemplary embodiments of systems such as, system 100 schematically depicted and described in regard to FIGS. 2-3, are provided. Embodiments of the system 100 depicted in FIGS. 2-3 may particularly include a dishwashing appliance 400 (FIG. 4), a refrigeration appliance 500 (FIG. 5), a washing machine appliance 600 (FIG. 6), or an air conditioning unit 700 (FIG. 7). The load device 110 (FIG. 2) may include any appropriate power electronics device, such as described herein. In particular embodiments, the load device 110 includes a motor, or particularly a three-phase motor, an alternating current (AC) motor, or a non-direct current (DC) motor generally. A driven mechanism is operably connected to the load device 110 to receive power. The driven mechanism includes any appropriate device that may be driven by a motor such as described herein. In various embodiments, the driven mechanism is any appropriate pump, compressor, rotor, impeller, etc., or combinations thereof, for exemplary embodiments of the system. It should be appreciated that the method 1000 and the system 100 may be applied to any appropriate appliance, power electronics device, or load device generally.

Figure 8A:
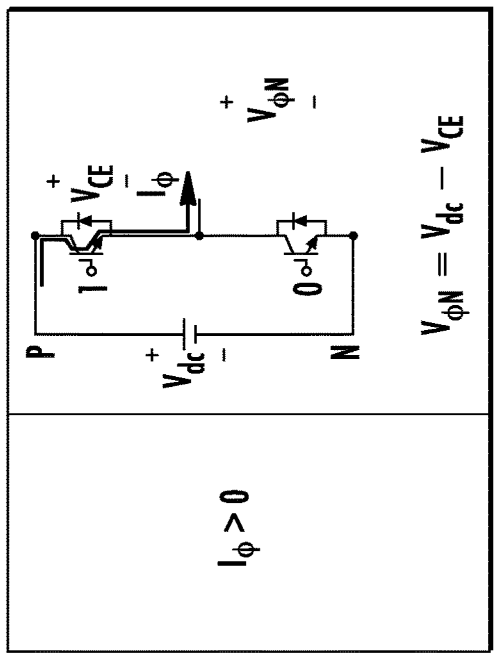
FIG. 8A depicts a schematic view of an exemplary insulated-gate bipolar transistor in accordance with exemplary embodiments of the present subject matter.
Figure 8B:
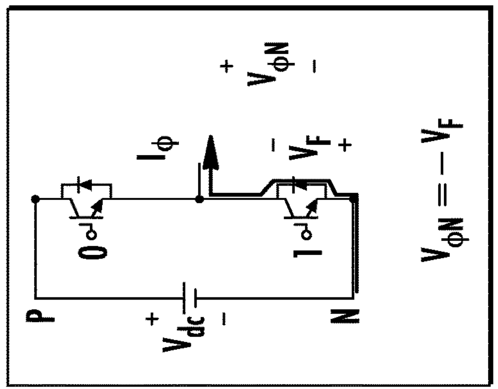
FIG. 8B depicts a schematic view of an exemplary insulated-gate bipolar transistor in accordance with exemplary embodiments of the present subject matter.
Figure 8C:
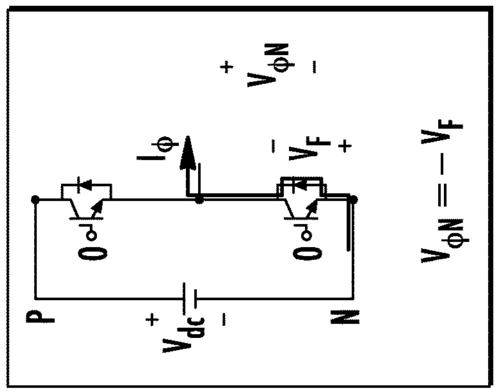
FIG. 8C depicts a schematic view of an exemplary insulated-gate bipolar transistor in accordance with exemplary embodiments of the present subject matter.
Figure 8D:
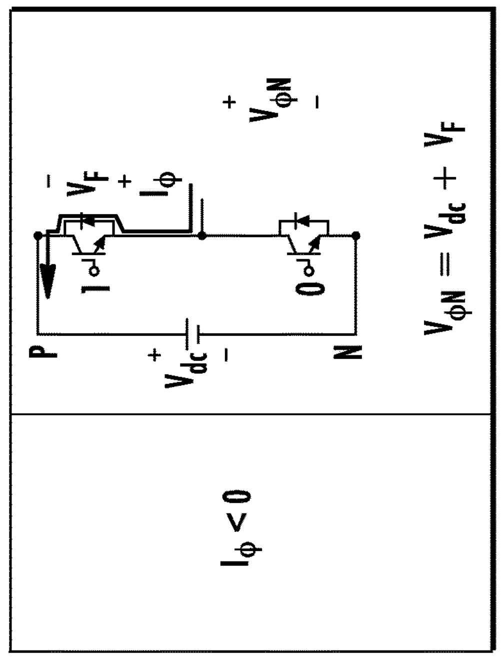
FIG. 8D depicts a schematic view of an exemplary diode-conducting inverter in accordance with exemplary embodiments of the present subject matter.
Figure 8E:
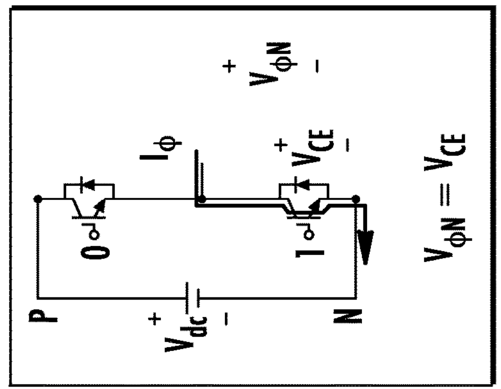
FIG. 8E depicts a schematic view of an exemplary diode-conducting inverter in accordance with exemplary embodiments of the present subject matter.
Figure 8F:
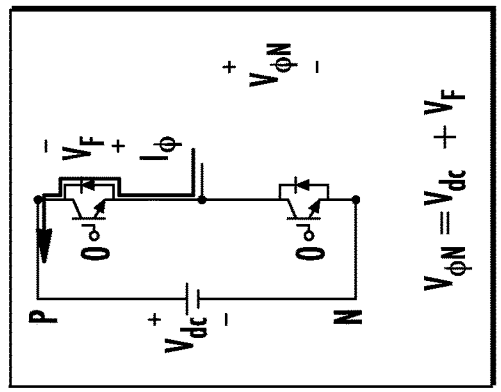
FIG. 8F depicts a schematic view of an exemplary diode-conducting inverter in accordance with exemplary embodiments of the present subject matter.

Referring now to FIGS. 8A-8C, exemplary schematic views of an insulated-gate bipolar transistor (IGBT) conducting inverter having a positive current leaving the switching leg. FIGS. 8D-8F depict schematic view of a diode-conducting inverter having a negative current coming from switching leg. Embodiments of the inverter provided may be included at the load device 110 or system 100 depicted and described in regard to FIGS. 1-7. While an IGBT and diode are depicted and referenced herein, it should be appreciated that other appropriate types of electronic switches may be employed. FIGS. 8A and 8D each depict a 1-0 state at which a high side is on and a low side is off. For the positive current case (FIG. 8A), current conducts through the high side IGBT. Accordingly, the phase output voltage ($V_{\phi N}$) is equal to the DC bus voltage ($V_{dc}$) less a voltage drop across the high side IGBT ($V_{CE}$). As such, the phase output voltage in the 1-0 state is $V_{\phi N}=V_{dc}-V_{CE}$. For the negative current case (FIG. 8D), current conducts through the high side diode. Accordingly, the phase output voltage ($V_{\phi N}$) is equal to the DC bus voltage ($V_{dc}$) less a voltage drop across the high side diode ($-V_F$). As such, the phase output voltage in the 1-0 state is $V_{\phi N}=V_{dc}+V_F$.

FIGS. 8B and 8E each depict a 0-1 state at which the high side IGBT is off and the low side IGBT is on. For the positive current case (FIG. 8B), current conducts through the low side diode. Accordingly, the phase output voltage ($V_{\phi N}$) is equal to the voltage drop across the low side diode ($-V_F$). As such, the phase output voltage in the 0-1 state is $V_{\phi N}=-V_F$. For the negative current case (FIG. 8E), current conducts through the low side IGBT. Accordingly, the phase output voltage ($V_{\phi N}$) is equal to the voltage drop across the low side IGBT ($V_{CE}$). As such, the phase output voltage in the 0-1 state is $V_{\phi N}=V_{CE}$.

FIGS. 8C and 8F each depicted a 0-0 state at which the high side IGBT and the low side IGBT are off. However, due to residual current flow, switching between the high side and the low side is non-instantaneous, such as to avoid short-circuiting or inverter shoot-through. The period between the 1-0 and 0-1 states forms deadtime that may affect determining voltage output. Depending at least in part on the direction of current, the output voltage in the 0-0 state may be either $-V_F$ (e.g., if current is positive) or ($V_{dc}+V_F$ (e.g., if current is negative).

Figure 9A:
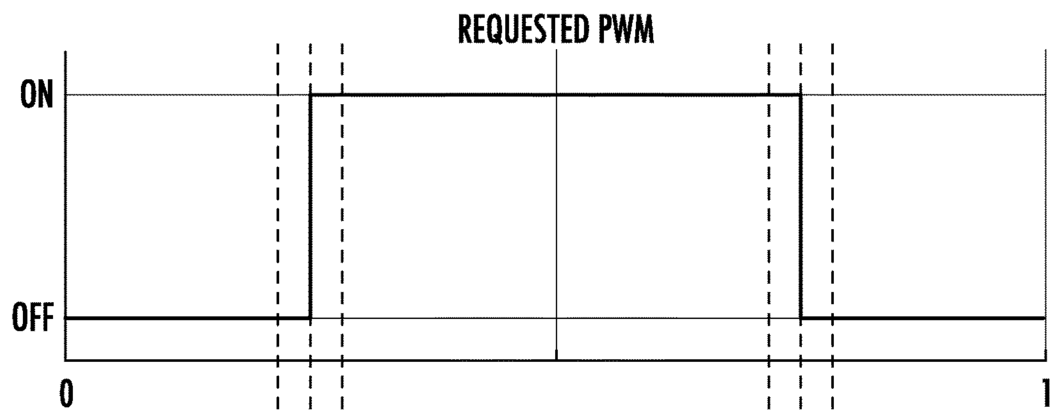
FIG. 9A provides a graph depicting an exemplary requested switching modulation scheme in accordance with exemplary embodiments of the present subject matter.
Figure 9B:
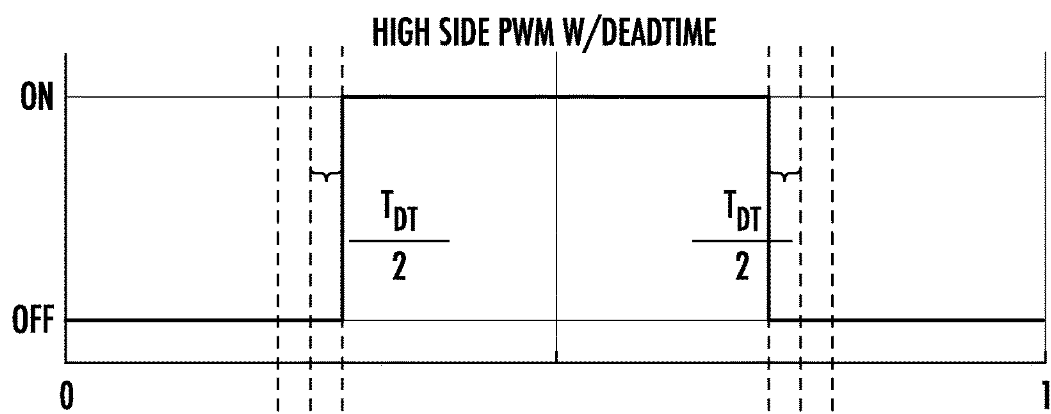
FIG. 9B provides a graph depicting an exemplary requested switching modulation scheme in a high state in accordance with exemplary embodiments of the present subject matter.
Figure 9C:
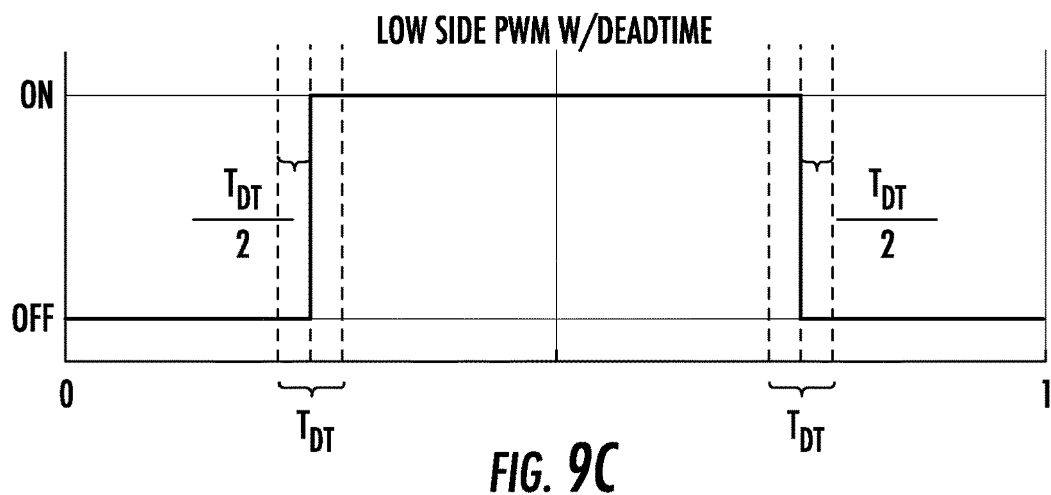
FIG. 9C provides a graph depicting an exemplary requested switching modulation scheme in a low state in accordance with exemplary embodiments of the present subject matter.

Referring now to FIGS. 9A-9C, graphs are provided depicting an exemplary requested switching modulation scheme (FIG. 9A) and transitions in the high side IGBT state (FIG. 9B) and the low-side IGBT state (FIG. 9C) with deadtime between the transitions of the IGBTs. An X-axis provides a time axis and a Y-axis provides an ON or OFF state. The switching modulation scheme, such as, but not limited to, a pulse-width modulation (PWM) or space-vector modulation or other appropriate type of modulation scheme, may have a fixed frequency defining a duty cycle ($d_\phi$) for each switching leg as a ratio of the percentage of time that the phase is in the high state versus the total switching period ($T_{sw}$). A pre-determined deadtime ($T_{DT}$) is generally inserted between the states, such as depicted in FIGS. 9A-9C, to prevent shoot-through. The effective deadtime at the switching legs depends on the ON and OFF times of the switching devices. Accordingly, the effective deadtime is $T_{DT_{eff}}=T_{DT}+T_{on}-T_{off}$.

Figure 10:
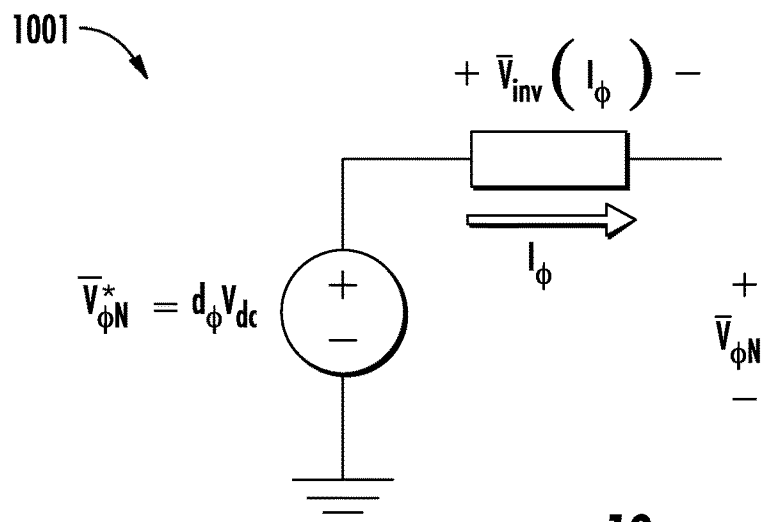
FIG. 10 depicts a schematic view of a switching leg in accordance with exemplary embodiments of the present subject matter.
Figure 11:
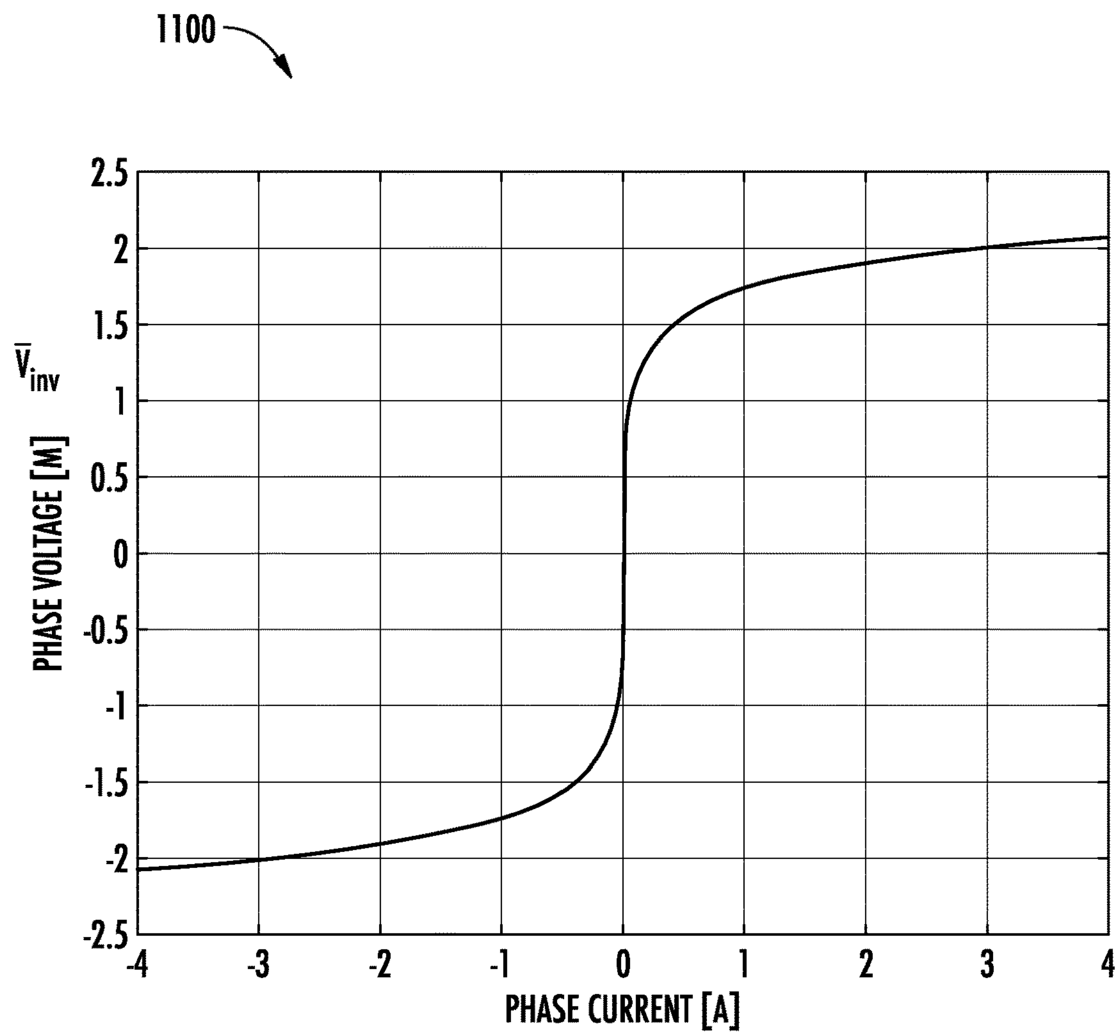
FIG. 11 provides a graph depicting an exemplary curve generated in accordance with exemplary embodiments of the method of the present subject matter.

Referring now to FIG. 10, an exemplary schematic switching leg 1001 in accordance with the present disclosure is provided. The schematic switching leg 1001 includes the inverter as an ideal voltage source ($\overline{V}^*_{\phi N}$) in series with a non-linear parasitic loss. The non-ideal switching-averaged phase voltage ($\overline{V}_{\phi N}$) is the ideal switching-averaged phase voltage ($\overline{V}^*_{\phi N}$) less the effective voltage drop across the inverter ($\overline{V}_{inv}$) as a function of the phase current ($I_\phi$), such as depicted in the exemplary graph 1100 in FIG. 11. The lumped or combined effect of the semiconductor or inverter voltage drop, such as described regarding FIGS. 8A-8F, and the deadtime effect, such as described regarding FIGS. 9A-9C, are represented as ($\overline{V}_{inv}(I_\phi)$). The ideal switching-averaged phase voltage ($\overline{V}^*_{\phi N}$) is the duty of the switching leg $d_\phi$ multiplied by the instantaneous DC bus voltage ($V_{dc}$).

Particular embodiments of a system configured to store or execute steps of the method 1000 are configured to determine the non-ideal switching-averaged phase voltage or actual phase voltage ($\overline{V}_{\phi N}$) without direct measurement. For instance, direct measurement may generally require apparatuses for obtaining high sampling rates and signal processing, which may be bulky, costly, and induce systemic losses.

The method 1000 includes at 1010 inducing, via the voltage source inverter, a DC current at a load device to obtain a load voltage value ($\overline{V}_L$). In a particular embodiment, the method 1000 includes at 1010 inducing, via a switching-modulation scheme at the voltage source inverter, a DC current at a load device to obtain a load voltage value. In various embodiments, the current is induced through the switching modulation scheme by applying a fixed set switching-averaged phase voltage ($\overline{V}_{\phi N}$) values or a closed loop current control. The switching modulation scheme (e.g., pulse-width modulation (PWM) or space vector modulation, etc.) may include a duty cycle and switching period, such as described above. The duty cycle is varied to adjust the output voltage applied to the load device.

The method 1000 includes at 1012 obtaining a DC resistance value (R) of the load device. In various embodiments, the load is a resistive-inductive load such that when the DC current is applied to the load, DC resistance R is known. The system and method provided herein includes a load having an inductance at or above a threshold inductance such that the current is DC. For instance, if the actual voltage applied to the motor is a PWM the threshold inductance will filter out to a substantially DC current. By using the inverter to induce a switching-averaged DC current ($I_L$) in the load device, the load voltage is generally $\overline{V}_L=R\cdot I_L$, in which the DC resistance R of the load device is known or obtained and the current ($I_L$) is measurable. In a still particular embodiment, the method 1000 includes at 1010 inducing the DC current at a load device to obtain the load voltage value ($\overline{V}_L$) when the load device, or particularly an AC motor, a three-phase motor, or non-DC motor generally, is at rest, such as to avoid electromagnetic field disturbance. The method 1000 includes at 1014 measuring a DC current value ($I_L$) induced at the load device.

Figure 12:
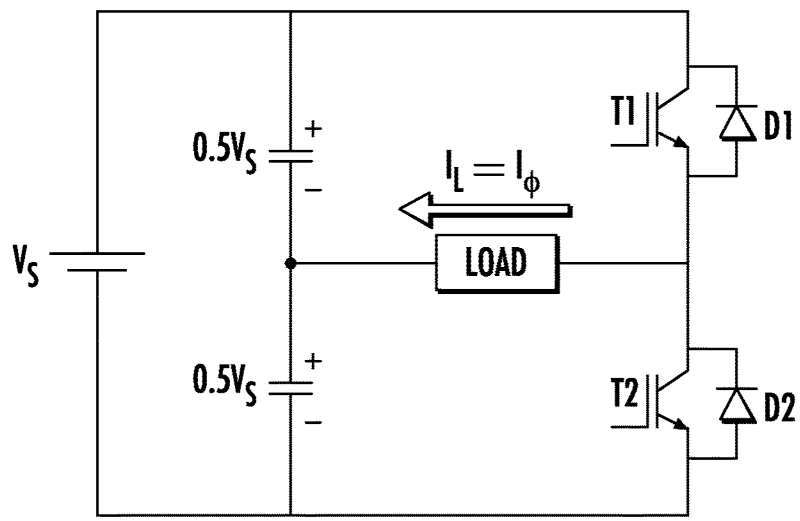
FIG. 12 depicts a schematic view of an exemplary half-bridge inverter in accordance with exemplary embodiments of the present subject matter.
Figure 13:
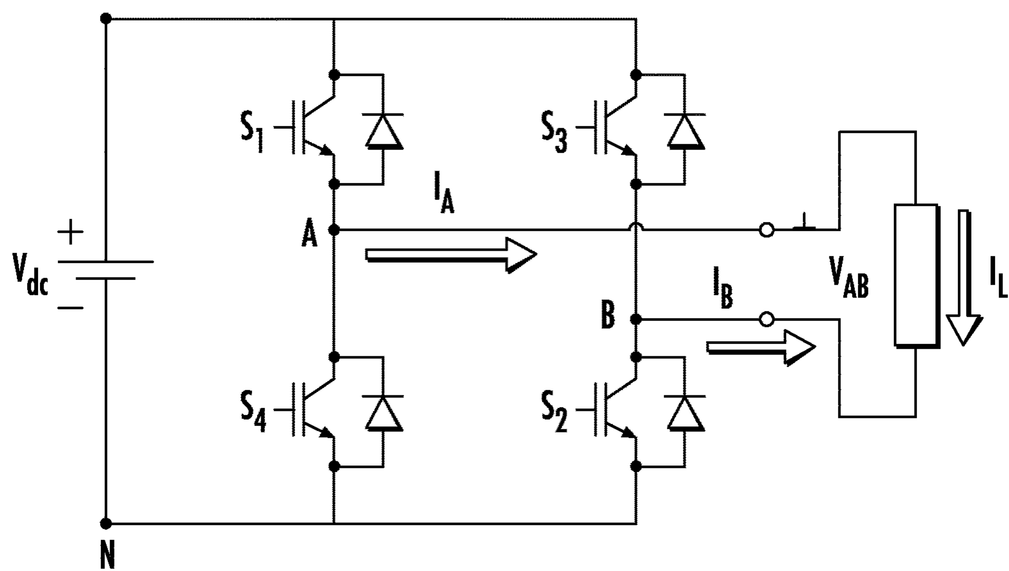
FIG. 13 depicts a schematic view of an exemplary H-bridge inverter in accordance with exemplary embodiments of the present subject matter.
Figure 14:
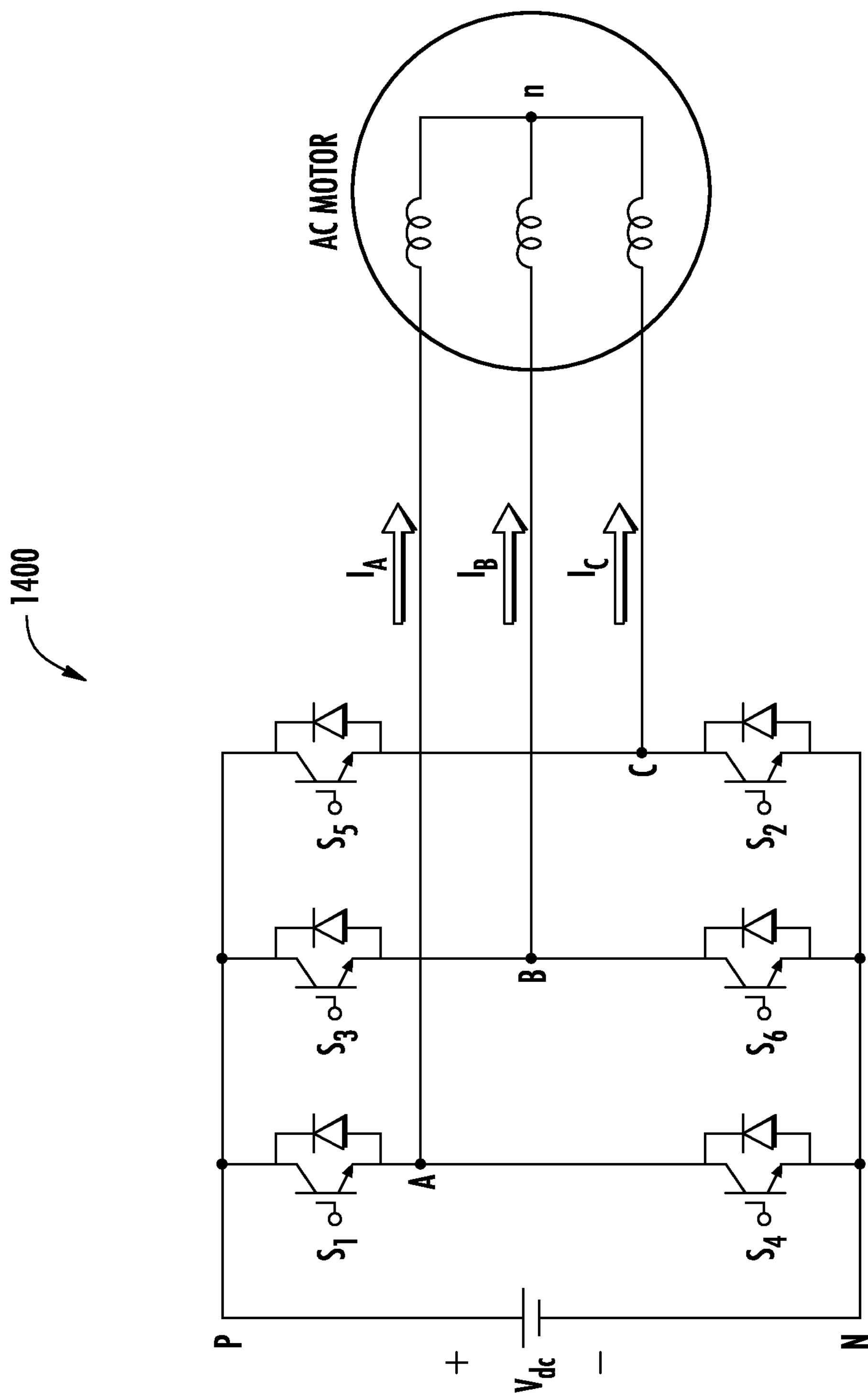
FIG. 14 depicts a schematic view of an exemplary three-phase inverter in accordance with exemplary embodiments of the present subject matter.

FIGS. 12-14 depict exemplary embodiments of electronic inverters. Referring to FIG. 12, an exemplary half-bridge inverter 1200 is depicted. A topology of the half-bridge inverter has the load voltage ($\overline{V}_L$) being the non-ideal switching-averaged phase voltage ($\overline{V}_{\phi N}$) less half of the DC bus voltage ($\frac{1}{2}V_{dc}$), accordingly $\overline{V}_L=\overline{V}_{\phi N}-\frac{1}{2}V_{dc}$, and switching-averaged DC current ($I_L$) is equal to phase current ($I_\phi$), accordingly $I_L=I_\phi$. Still further, inducing the DC current such as provided at step 1010 allows for obtaining the load voltage ($\overline{V}_L$) from the obtained resistance (R) at step 1012 and DC current values at step 1014. Accordingly load voltage is determined by $\overline{V}_L=R\cdot L$.

As provided above, the non-ideal switching-averaged phase voltage ($\overline{V}_{\phi N}$) is the ideal switching-averaged phase voltage ($\overline{V}^*_{\phi N}$) less the effective voltage drop across the inverter ($\overline{V}_{inv}$) as a function of the phase current ($I_\phi$), accordingly $\overline{V}_{\phi N}=\overline{V}^*_{\phi N}-\overline{V}_{inv}(I_\phi)$.

In particular embodiments, the method 1000 includes at 1016 determining an ideal switching-averaged voltage based on the switching modulation scheme. In regard to the half-bridge inverter depicted in FIG. 12, the ideal switching-averaged voltage is an ideal switching-averaged phase voltage ($\overline{V}^*_{\phi N}$). As provided above, determining the ideal switching-averaged phase voltage is the duty of the switching leg ($d_\phi$) multiplied by the instantaneous DC bus voltage ($V_{dc}$). The method 1000 at 1016 may include at 1018 obtaining the duty cycle ($d_\phi$) and measuring the DC bus voltage ($V_{dc}$), such as described above.

In a particular embodiment, the method 1000 includes at 1020 determining a combined semiconductor voltage drop and deadtime effect ($V_{inv}(I_\phi)$). The method 1000 at 1020 may particularly include at 1021 comparing the load voltage value ($\overline{V}_L$) to an inverter output voltage ($V_{\phi N}$) to determine a combined semiconductor voltage drop and a deadtime effect $V_{inv}(I_\phi)$ as a function of the DC current value. When the terms above are substituted, such as provided above, $$\overline{V}_{inv}(I_\phi) = \overline{V}^*_{\phi N} - \frac{1}{2}V_{dc} - R\cdot I_\phi.$$

The combined semiconductor voltage drop and deadtime effect ($V_{inv}(I_\phi)$) is the loss experienced by the ideal switching-averaged phase voltage, such as depicted and described regarding FIG. 12. Embodiments of the system and method provided herein allow for determining the combined semiconductor voltage drop and deadtime effect curve ($\overline{V}_{inv}(I_\phi)$), or parasitic losses, without requiring directly measuring the actual phase voltage ($\overline{V}_{\phi N}$), such as to obviate a need for obtaining high sampling rates and signal processing, which may be bulky and costly, and may allow for mitigating further systemic losses.

In certain embodiments, the method 1000 includes at 1022 generating a combined semiconductor voltage drop and deadtime effect curve ($\overline{V}_{inv}(I_\phi)$). The method 1000 at 1024 may include one or more iterations of the steps at 1010, 1016, and 1020. The method 1000 at 1022 may empirically constructs curve ($\overline{V}_{inv}(I_\phi)$) characterizing a relationship between semiconductor voltage drop and deadtime effect, such as to gain inference of the semiconductor voltage drop at respective DC current values.

In certain embodiments, the method 1000 includes at 1026 adjusting a switching modulation scheme such that the resulting ideal switching-averaged voltage is based on the combined semiconductor voltage drop and the deadtime effect ($\overline{V}_{inv}(I_\phi)$). In a particular embodiment, such as for the half-bridge inverter depicted in FIG. 12, the method 1000 at 1026 includes adjusting a switching modulation scheme such that the resulting ideal switching-averaged phase voltage ($\overline{V}^*_{\phi N}$) is based on the combined semiconductor voltage drop and the deadtime effect. In various embodiments, adjusting the inverter output voltage includes modifying the switching modulation scheme such that the resulting inverter output voltage is equal to the desired voltage anticipated by the curve $\overline{V}_{inv}(I_\phi)$ generated at 1022. In various embodiments, adjusting the modulation scheme includes adjusting one or more of the phase-neutral voltage ($\overline{V}_{\phi n}$), the phase-negative voltage ($\overline{V}_{\phi N}$), or the duty cycle ($d_\phi$).

The relationship between DC current values ($I_L$) and phase current ($I_\phi$) may be a function of inverter type. Referring now to FIG. 13, an exemplary H-bridge inverter 1300 is depicted. Embodiments of the method 1000 described above in regard to FIG. 12 are substantially included in regard to the H-bridge inverter depicted in FIG. 13. A topology of the H-bridge inverter has the load voltage ($\overline{V}_L$) as $\overline{V}_L=\overline{V}_{AN}-\overline{V}_{BN}$, and switching-averaged DC current ($I_L$) is $I_L=I_A=-I_B$. Still further, inducing the DC current such as provided at step 1010 allows for obtaining the load voltage ($V_L$) from the obtained resistance (R) at step 1012 and DC current values at step 1014. Accordingly load voltage is determined by $\overline{V}_L=R\cdot I_L$.

From the non-ideal switching leg voltage equation: $\overline{V}_{AN}=\overline{V}^*_{AN}-\overline{V}_{inv}(I_L)$, $\overline{V}_{BN}=\overline{V}^*_{BN}-\overline{V}_{inv}(-I_L)$.

When $\overline{V}_{inv}(I_\phi)$ is odd and identical for each phase: $\overline{V}_{inv}(-I_L)=-\overline{V}_{inv}(I_L)$. Accordingly, $$\overline{V}_L=\overline{V}^*_{AN}-\overline{V}^*_{BN}-2\overline{V}_{inv}(I_L) \text{ and } \overline{V}_{inv}(I_L)=\frac{1}{2}\left(\overline{V}^*_{AN}-\overline{V}^*_{BN}-R\cdot I_L\right).$$

For the H-bridge inverter such as depicted at FIG. 13, the ideal switching-averaged voltage at step 1016 includes $\overline{V}^*_{AN}$, $\overline{V}^*_{BN}$ determined from the switching modulation scheme. Additionally, $I_L=I_\phi$ when generating the combined semiconductor voltage drop and deadtime effect curve ($\overline{V}_{inv}(I_\phi)$) at step 1022 for the H-bridge inverter.

Referring now to FIG. 14, an exemplary three-phase inverter 1400 is depicted. Embodiments of the method 1000 described above in regard to FIG. 13 is substantially included in regard to the three-phase inverter depicted in FIG. 14. The method 1000 for the three-phase inverter may include at 1050 setting one phase to zero and setting the other two phases opposite of one another. Accordingly, $I_C=0$, and $I_B=-I_A$. The method 1000 may be substantially similar to the H-bridge inverter described in regard to FIG. 13. The method 1000 when applied to the three-phase inverter may further include a phase-to-phase resistance of 2 R. Accordingly, $$\overline{V}_{inv}(I_\phi)=\frac{1}{2}\left(\overline{V}^*_{AN}-\overline{V}^*_{BN}-2R\cdot I_\phi\right).$$

Referring back to FIGS. 1-2, method 1000 may generate and store the curve $\overline{V}_{inv}(I_\phi)$ or calibration data at memory 124, such as at instructions 126. The curve may include a graph, such as exemplary depicted in FIG. 11, or as a lookup table, chart, function, schedule, or other appropriate format. Adjustments or modifications to the switching modulation scheme may also be stored at the memory 124, such as at instructions 126. Embodiments of the method 1000 allow for online, real-time, or self-calibration modifications to the switching modulation scheme such that the resulting ideal switching-averaged phase voltage ($\overline{V}^*_{\phi N}$) includes a compensation term equal to the combined semiconductor voltage loss and deadtime effect $\overline{V}_{inv}(I_\phi)$ in addition to the desired voltage at the load device. The compensation term is obtained from the generated curve, lookup table, graph, chart, schedule, etc. based on the current feedback.

Further aspects of the invention are provided by the subject matter of the following clauses:

1. A method for operating a voltage source inverter, the method including inducing, via the voltage source inverter, a DC current at a load device to obtain a load voltage value; determining an ideal switching-averaged voltage based on a switching modulation scheme; determining a combined semiconductor voltage drop and deadtime effect; and adjusting the switching modulation scheme such that a resulting ideal switching-averaged voltage is based on the combined semiconductor voltage drop and deadtime effect and the load voltage value.
2. The method of any one or more clauses herein, wherein inducing the DC current at the load device includes inducing, via the switching-modulation scheme at the voltage source inverter, the DC current at a load device to obtain the load voltage value.
3. The method of any one or more clauses herein, the method including obtaining a DC resistance value of the load device.
4. The method of any one or more clauses herein, the method including measuring a DC current value induced at the load device.
5. The method of any one or more clauses herein, wherein inducing the DC current includes inducing, via a closed loop current control or a fixed switching-averaged phase voltage, the DC current at the load device.
6. The method of any one or more clauses herein, wherein inducing the DC current at a load device to obtain the load voltage value is when the load device is at rest.
7. A system for voltage calibration, the system including a load device, a voltage source inverter, and a controller, the controller configured to execute instructions that, when performed by the load device, causes the load device to perform operations, the operations including inducing, via the voltage source inverter, a DC current at a load device to obtain a load voltage value; determining an ideal switching-averaged voltage based on a switching modulation scheme; determining a combined semiconductor voltage drop and deadtime effect; and adjusting the switching modulation scheme such that a resulting ideal switching-averaged voltage is based on the combined semiconductor voltage drop and deadtime effect and the load voltage value.
8. The system of any one or more clauses herein, wherein inducing the DC current at the load device includes inducing, via the switching-modulation scheme at the voltage source inverter, the DC current at a load device to obtain the load voltage value.
9. The system of any one or more clauses herein, the operations including obtaining a DC resistance value of the load device; and measuring a DC current value induced at the load device.
10. The system of any one or more clauses herein, wherein determining the combined semiconductor voltage drop and deadtime effect comprises iteratively performing the steps of inducing the DC current at the load device to obtain the load voltage value; determining the ideal switching-averaged voltage based on the switching modulation scheme and the induced DC current; and determining the combined semiconductor voltage drop and deadtime effect relative to the induced DC current.

11. The system of any one or more clauses herein, wherein inducing the DC current includes inducing, via a closed loop current control or a fixed switching-averaged phase voltage, the DC current at the load device.

12. The system of any one or more clauses herein, wherein inducing the DC current at a load device to obtain the load voltage value is when the load device is at rest.

13. The system of any one or more clauses herein, the load device including a motor, wherein inducing the DC current is at the motor to obtain a load voltage value.

14. The system of any one or more clauses herein, wherein the motor is a three-phase motor or an AC motor.

15. The system of any one or more clauses herein, wherein the system is an appliance.

16. A controller for a load device, the controller including a memory device operably coupled to a processor, the memory device configured to store instructions that, when executed by the processor, causes the load device to perform operations, the operations including inducing, via the voltage source inverter, a DC current at the load device to obtain a load voltage value; determining, from the load voltage value, a DC current value; comparing the load voltage value to an inverter output voltage to determine a semiconductor voltage drop and a deadtime effect as a function of the DC current value; and adjusting the inverter output voltage based on the semiconductor voltage drop and the deadtime effect.

17. The controller of any one or more clauses herein, wherein inducing the DC current at the load device includes inducing, via the switching-modulation scheme at the voltage source inverter, the DC current at a load device to obtain the load voltage value.

18. The controller of any one or more clauses herein, the operations including obtaining a DC resistance value of the load device; and measuring a DC current value induced at the load device.

19. The controller of any one or more clauses herein, wherein determining the combined semiconductor voltage drop and deadtime effect comprises iteratively performing the steps of inducing the DC current at the load device to obtain the load voltage value; determining the ideal switching-averaged voltage based on the switching modulation scheme and the induced DC current; and determining the combined semiconductor voltage drop and deadtime effect relative to the induced DC current.

20. The controller of any one or more clauses herein, wherein inducing the DC current includes inducing, via a closed loop current control or a fixed switching-averaged phase voltage, the DC current at the load device.

21. The controller of any one or more clauses herein, configured to store or execute steps of the method of any one or more clauses herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a voltage source inverter, the method comprising:

inducing, via the voltage source inverter, a DC current at a load device to obtain a load voltage value;

determining an ideal switching-averaged voltage based on a switching modulation scheme;

determining a combined semiconductor voltage drop and deadtime effect; and adjusting the switching modulation scheme such that a resulting switching-averaged voltage is based on the combined semiconductor voltage drop and deadtime effect and the load voltage value.

2. The method of claim 1, wherein inducing the DC current at the load device comprises inducing, via the switching-modulation scheme at the voltage source inverter, the DC current at a load device to obtain the load voltage value.

3. The method of claim 1, the method comprising:

obtaining a DC resistance value of the load device.

4. The method of claim 1, the method comprising:

measuring a DC current value induced at the load device.

5. The method of claim 1, wherein inducing the DC current comprises inducing, via a closed loop current control or a fixed switching-averaged phase voltage, the DC current at the load device.

6. The method of claim 1, wherein inducing the DC current at a load device to obtain the load voltage value is when the load device is at rest.

7. A system for voltage calibration, the system comprising:

a load device;

a voltage source inverter; and a controller, the controller configured to execute instructions that, when performed by the load device, causes the load device to perform operations, the operations comprising;

inducing, via the voltage source inverter, a DC current at a load device to obtain a load voltage value;

determining an ideal switching-averaged voltage based on a switching modulation scheme;

determining a combined semiconductor voltage drop and deadtime effect; and adjusting the switching modulation scheme such that a resulting switching-averaged voltage is based on the combined semiconductor voltage drop and deadtime effect and the load voltage value.

8. The system of claim 7, wherein inducing the DC current at the load device comprises inducing, via the switching-modulation scheme at the voltage source inverter, the DC current at a load device to obtain the load voltage value.

9. The system of claim 8, the operations comprising:

obtaining a DC resistance value of the load device; and measuring a DC current value induced at the load device.

10. The system of claim 8, wherein determining the combined semiconductor voltage drop and deadtime effect comprises iteratively performing the steps of:

inducing the DC current at the load device to obtain the load voltage value;

determining the ideal switching-averaged voltage based on the switching modulation scheme and the induced DC current; and determining the combined semiconductor voltage drop and deadtime effect relative to the induced DC current.

11. The system of claim 7, wherein inducing the DC current comprises inducing, via a closed loop current control or a fixed switching-averaged phase voltage, the DC current at the load device.

12. The system of claim 7, wherein inducing the DC current at a load device to obtain the load voltage value is when the load device is at rest.

13. The system of claim 7, the load device comprising:

a motor, wherein inducing the DC current is at the motor to obtain a load voltage value.

14. The system of claim 13, wherein the motor is a three-phase motor or an AC motor.

15. The system of claim 7, wherein the system is an appliance.

16. A controller for a load device, the controller comprising a memory device operably coupled to a processor, the memory device configured to store instructions that, when executed by the processor, causes the load device to perform operations, the operations comprising:

inducing, via the voltage source inverter, a DC current at the load device to obtain a load voltage value;

determining, from the load voltage value, a DC current value;

comparing the load voltage value to an inverter output voltage to determine a semiconductor voltage drop and a deadtime effect as a function of the DC current value; and adjusting the inverter output voltage based on the semiconductor voltage drop and the deadtime effect.

17. The controller of claim 16, wherein inducing the DC current at the load device comprises inducing, via the switching-modulation scheme at the voltage source inverter, the DC current at a load device to obtain the load voltage value.

18. The controller of claim 16, the operations comprising:

obtaining a DC resistance value of the load device; and measuring a DC current value induced at the load device.

19. The controller of claim 16, wherein determining the combined semiconductor voltage drop and deadtime effect comprises iteratively performing the steps of:

inducing the DC current at the load device to obtain the load voltage value;

determining the ideal switching-averaged voltage based on the switching modulation scheme and the induced DC current; and determining the combined semiconductor voltage drop and deadtime effect relative to the induced DC current.

20. The controller of claim 16, wherein inducing the DC current comprises inducing, via a closed loop current control or a fixed switching-averaged phase voltage, the DC current at the load device.

* * * * *